United States Patent

Fennell

[11] Patent Number: 5,958,242
[45] Date of Patent: Sep. 28, 1999

[54] IN SITU FILTER CLEANING

[75] Inventor: Paul Antony Harry Fennell, Didcot, United Kingdom

[73] Assignee: AEA Technology PLC, Didcot, United Kingdom

[21] Appl. No.: 08/763,092

[22] Filed: Dec. 10, 1996

[30] Foreign Application Priority Data

Dec. 14, 1995 [GB] United Kingdom ............... 95 255583

[51] Int. Cl.$^6$ ........................... B01D 15/04; B01D 61/00
[52] U.S. Cl. ..................... 210/636; 210/650; 210/748; 204/554
[58] Field of Search ............................ 204/554, 660, 204/665; 210/636, 500.36, 500.38, 650, 500.25, 500.42, 748; 55/131, 498

[56] References Cited

U.S. PATENT DOCUMENTS

| 4,167,480 | 9/1979 | Mach ........................................ 210/652 |
| 4,331,523 | 5/1982 | Kawasaki . |
| 4,493,756 | 1/1985 | Degren . |
| 4,594,138 | 6/1986 | Thompson . |
| 4,623,365 | 11/1986 | Bergman . |
| 5,141,714 | 8/1992 | Obuchi . |
| 5,597,479 | 1/1997 | Johnson ................................ 210/192 |

FOREIGN PATENT DOCUMENTS

| 0474365 A1 | 3/1992 | European Pat. Off. . |
| 0577026 A2 | 1/1994 | European Pat. Off. . |
| 2142345 | 1/1985 | United Kingdom . |
| 2160545 | 12/1985 | United Kingdom . |
| 2290086 | 12/1995 | United Kingdom . |
| WO 89/00445 | 1/1989 | WIPO . |
| WO 92/21433 | 12/1992 | WIPO . |

*Primary Examiner*—Ana Fortuna
*Attorney, Agent, or Firm*—William H. Holt

[57] ABSTRACT

A filter which can be cleaned in situ consists of a filter membrane (33), and fluid permeable electrodes (34, 35). The membrane may be one of the electrodes, or may be electrically non-conducting but integral with or in contact with one of the electrodes (34). The electrodes (34, 35) are separated from each other only by a fluid permeable electrically insulating sheet. This sheet may be less than 1 mm thick, and may be the filter membrane (33). The filter is cleaned by periodic brief applications of electric current between the electrodes (34, 35) so that gas is generated electrolytically, and the close spacing of the electrodes (34, 35) reduces the electric power required.

14 Claims, 1 Drawing Sheet

IN SITU FILTER CLEANING

This invention relates to a filter, and in particular to a filter incorporating means by which it can be cleaned in situ, and to a method of cleaning such a filter.

A method for cleaning an electrically-conducting filter is described in GB 2 160 545 B which enables fouling to be removed from the filter in situ. In this method an electrochemical cell is established comprising the filter as a first electrode, a counter electrode, and the process liquid as electrolyte. At intervals during the filtration process a potential difference is applied briefly between the two electrodes, so as to generate at the filter a gaseous product which may be in the form of microbubbles, and which cleans the filter. For example a current of 500–3000 A m$^{-2}$ of membrane might be applied for 1–5 seconds periodically between 4–15 times an hour. The potential difference is typically applied such that the filter itself is cathodic, to minimise its corrosion, and the filter may be a metallic microporous membrane, or a conducting ceramic membrane. A similar process is described in EP 0 380 266 A, in which the filter may be a porous layer for example of sintered zirconia incorporating a metal mesh, or may be a porous layer superimposed on such a metal mesh. The counter electrode may be of platinised titanium, or as described in EP 0 474 365 A it may be of low chromium stainless steel. It will be appreciated that during the applications of the cleaning potential difference there is considerable electrical power consumption.

According to the present invention there is provided a filter including a filter membrane, a fluid-permeable first electrode and a fluid-permeable second electrode, electric supply means for causing an electric current to flow periodically and briefly between the first and the second electrodes through a process liquid as electrolyte with a current density of at least 500 A m$^{-2}$ so as to generate a gaseous product, at least 75% of the brief pulses of current having the same polarity, wherein the filter membrane either is one of the electrodes or is not electrically conducting but is integral with or in contact with one of the electrodes, and wherein the first and the second electrodes are separated from each other only by a fluid-permeable electrically insulating sheet.

The insulating sheet ensures that the two electrodes cannot touch each other, and so ensures that electrolysis of the process liquid occurs. The sheet therefore enables the electrodes to be arranged much closer together, and so considerably decreases the electrical power consumption. Furthermore the sheet ensures that the separation of the electrodes is uniform, so ensuring uniform generation of the gaseous product and hence uniform cleaning of the membrane. The sheet may be a single layer of permeable material, for example a nylon mesh, or may be a stack of such layers for example two or three layers of a polyamide cloth with pore sizes up to 18 $\mu$m, each of thickness 0.3 mm. The thickness of the sheet, and hence the separation of the electrodes, is preferably between 0.2 mm and 3.0 mm, more preferably less than 1 mm, for example 0.6 mm. Because both electrodes are in such close proximity to the filter membrane, the gas bubbles generated at both electrodes help to remove foulant from the filter membrane.

Where the filter membrane is not electrically conducting and is not integral with an electrode, then the filter membrane may be the insulating sheet, or be one layer of it. The electrodes should be much more readily fluid permeable than the filter membrane, and preferably define pores or perforations at least 0.5 mm across, more preferably at least 1 mm, for example 2 mm or 4 mm across. The insulating sheet, if it isn't the filter membrane, should also have larger pores than the filter membrane, preferably at least five times larger pores, and may have pores or perforations as large as those in electrodes that is to say up to 1 mm, 2 mm or even 4 mm. It is desirable to bond the electrodes to the opposite surfaces of the insulating sheet, and this prevents them separating as a result of gas bubble generation.

The filter membrane may be an electrode or integral with an electrode, and so may comprise a porous carbon structure, such as a tube, with a zirconia surface coating (suitable for fine microfiltration or ultrafiltration), or a sintered stainless steel microfibre layer (with pore size about 3 $\mu$m), or a titania coated stainless steel filter (with pore size about 0.2 $\mu$m). Alternatively the filter membrane may be non-conducting, and in contact with an electrode; in this arrangement a wide variety of different types of membrane can be used. For example the filter membrane might be of polypropylene, nylon, PVdF (polyvinylidenefluoride), polycarbonate, zirconia cloth or other known filter membranes or micro- or ultrafiltration membranes. In these cases the electrode at the filtrate side of the filter membrane is desirably arranged to be cathodic during cleaning pulses, as twice as much gas will be generated at it.

The invention also provides a method of cleaning such a filter in situ, by periodically and briefly causing an electric current to flow between the electrodes through the process liquid. Preferably while the current is caused to flow the pressure difference across the filter membrane is reduced to zero or to negative values, for example by preventing outflow of filtrate and/or by ceasing to supply process liquid to the upstream side of the filter membrane, as this ensures that foulant material is dislodged by bubbles even if those bubbles are generated at the filtrate side of the membrane, and any resulting backflow of filtrate aids the cleaning process.

The electric current that brings about the cleaning of the filter membrane is only applied periodically and briefly, but when it is applied it must be of large enough current density to produce a gaseous product by electrolysis. Thus the current density must be at least 500 A m$^{-2}$. The frequency and duration of the pulses of cleaning current clearly depend on how rapidly the membrane becomes fouled, and so on the nature of the liquid being treated. Pulses of current of duration between 1 second and 5 seconds are usually found to be effective, although the duration might be as much as 10 or even 15 seconds. Similarly the frequency might typically be between 4 and 15 times per hour, i.e. at intervals of between 15 and 4 minutes, but if the process liquid contains very little foulant material then cleaning might only be necessary once every hour or two. It should be appreciated that, as described in GB 2 290 086 A, the polarity of the cleaning pulses may be occasionally reversed for example for one pulse in every eight, or that a considerably smaller current may be caused to flow for prolonged periods between the electrodes in the opposite direction to that of the cleaning pulses, this reverse current being at a density no more than 200 A m$^{-2}$.

The invention will now be further described by way of example only, and with reference to the accompanying drawings in which:

DETAILED DESCRIPTION OF THE INVENTION

Figure 1:
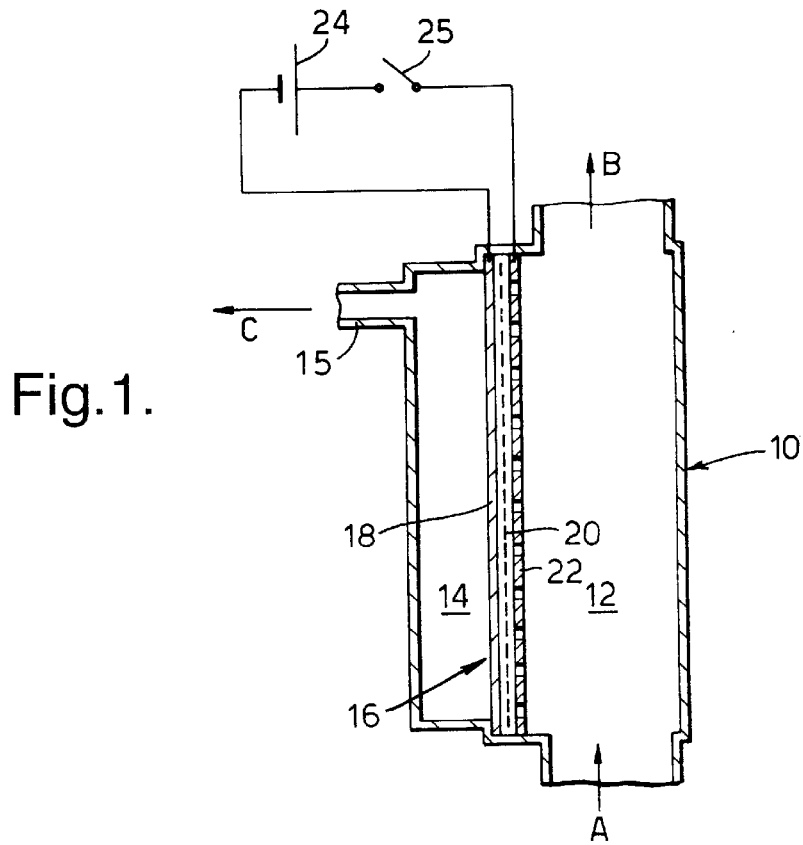
FIG. 1 shows a diagrammatic sectional view of a filter apparatus.

Referring to FIG. 1 there is shown a filter apparatus 10 comprising a treatment chamber 12 through which a liquid or a slurry to be treated is caused to flow, the liquid (or slurry) entering as indicated by arrow A and leaving the chamber 12 as indicated by arrow B. A filtrate chamber 14 is separated from the chamber 12 by a filter assembly 16 through which a filtrate liquid permeates, and the filtrate liquid can leave the filtrate chamber 14 as indicated by arrow C through an outlet duct 15.

The filter assembly 16 includes a stainless steel microfibre filter layer 18 which has pore sizes about 3 µm. The surface of the layer 18 facing the treatment chamber 12 is covered by a coarse woven nylon mesh 20 about 0.5 mm thick and with holes about 2 mm wide, which is itself covered by perforated counter electrode 22 of 9% chromium stainless steel with 2 mm wide diamond-shaped apertures. The filter layer 18 and the counter-electrode 22 are connected to a source 24 of electric current and a switch 25.

In operation of the filter apparatus 10 a liquid to be treated is pumped through the chamber 14 and as a result of the pressure drop across the filter assembly 16 a filtrate liquid permeates into the chamber 14 to emerge through the duct 15. The filtrate flux gradually decreases due to build-up of foulant on the surface of the filter layer 18. At periodic intervals, for example once every 20 minutes, the power supply 24 is connected briefly to the filter layer 18 and the counter electrode 22 for say 5 seconds, so the current density at the surface of the layer 18 is 600 A m$^{-2}$. Electrolysis of the liquid results in the generation of microbubbles of gas at both the filter layer 18 and the counter electrode 22 which disrupt the foulant and dislodge it. This considerably improves the filtrate flux. During the application of the current pulse it is desirable to also decrease the pressure drop across the filter assembly 16, which may be achieved by closing or obstructing the outlet duct 15.

Figure 2:
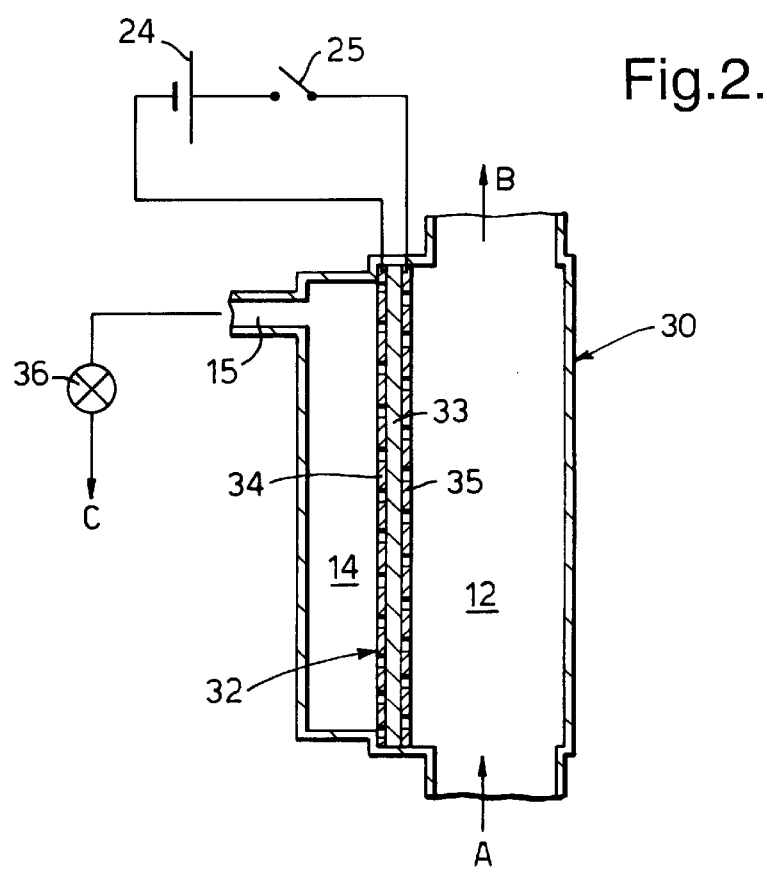
FIG. 2 shows a diagrammatic sectional view of an alternative filter apparatus.

Referring now to FIG. 2 there is shown an alternative filter apparatus 30 which has many features in common with the apparatus 10 of FIG. 1, comprising a treatment chamber 12 and a filtrate chamber 14 which are separated by a filter assembly 32. The filter assembly 32 comprises a woven polypropylene cloth filter membrane 33 sandwiched between and thermally bonded to a stainless steel wire gauze 34 on the filtrate side, and a 9% chromium stainless steel perforated plate 35 on the treatment chamber 12 side. The membrane 33 has pore sizes of about 3 µm, while the gauze 34 has 1 mm apertures, and the perforated plate 35 has 2.5 mm apertures. The gauze 34 and the plate 35 are connected to a switch 25 and an electric power supply 24 such that the gauze 34 is the cathode.

In operation of the filter apparatus 30 the liquid or slurry to be treated is pumped through the chamber 12, and filtrate emerges through the filter assembly 32 into the chamber 14. A valve 36 enables the outflow C of filtrate from the apparatus 30 to be controlled. Foulant will gradually build up on the filter membrane 33, and at periodic intervals the power supply 24 is switched on for say 5 or 10 seconds, at a current density at the gauze 34 and the plate 35 of 600 A m$^{-2}$. At the same time the valve 36 is closed. Microbubbles are generated by electrolysis at both the gauze 34 and the plate 35, and so gas bubbles pass through the membrane 33 towards the chamber 12 (because the valve 36 is closed), dislodging and removing the foulant. This considerably improves the filtrate flux when the valve 36 is reopened and the power supply 24 switched off.

It will be appreciated that a wide variety of different filter membranes may be used in place of the woven polypropylene cloth membrane 33 in the apparatus 30, being chosen in accordance with the nature of the liquid to be treated, and the type of filtration required. For example the membrane 33 might be replaced by a PVdF membrane with pore sizes about 0.45 µm if microfiltration is required. The membrane 33 might be replaced by a fine woven zirconia cloth, with pore sizes less than 1 µm, if chemically aggressive (e.g. alkaline) or high temperature liquids are to be filtered; in this case the electrodes 34, 35 would be spot-glued to the membrane. Thus the membrane may be one intended for ultrafiltration (with pore sizes typically less than about 0.03 µm), or one intended for microfiltration (with pore sizes between about 0.1 µm and 5 µm), or for conventional filtration (with pore sizes larger than about 5 µm). Another suitable material for the filter membrane comprises glass fibres coated with PTFE (polytetrafluoroethylene) and woven to form a cloth.

It will also be appreciated that the shape of the filter membrane may differ from the flat sheet shown in the drawings, and that the filter membrane might instead be a cylindrical tube, or might be a spiral. For example a polycarbonate filter membrane sandwiched between a flexible stainless steel wire gauze and a flexible platinised titanium wire gauze may be sandwiched between coarse nylon mesh spacer meshes and then wound into a spiral filter assembly along with an impermeable plastic sheet.

I claim:

1. A method of cleaning a filter assembly in situ during use of the filter assembly to filter a process liquid, the filter assembly comprising a filter membrane which is not electrically conducting, a fluid-permeable first electrode, and a fluid-permeable second electrode, the filter membrane being integral with or in contact with one of the electrodes, and wherein the first and the second electrodes are spaced apart from each other by a sheet of fluid-permeable electrically insulating material, the filter assembly also including electric supply means connected to the first and the second electrodes, and the method comprises causing an electric current to flow periodically and briefly between the first and the second electrodes through the process liquid as electrolyte with a current density of at least 500 A/M$^2$ so as to generate a gaseous product, at least 75 percent of the brief pulses of current having the same polarity, so that fouling material on the filter membrane is dislodged.

2. A method as claimed in claim 1 wherein the separation between the first and the second electrodes is between 0.2 mm and 3.0 mm.

3. A method as claimed in claim 1 wherein the filter membrane is a layer of the insulating sheet.

4. A method as claimed in claim 1 wherein the filter membrane is selected from the group consisting of polypropylene, nylon, polyvinylidene fluoride, polycarbonate, and zirconia cloth.

5. A method as claimed in claim 1 wherein the electrodes define pores or perforations at least 0.5 mm across.

6. A method as claimed in claim 5 wherein at least one of the electrodes defines perforations between 2 mm and 4 mm across.

7. A method as claimed in claim 1 including the step of reducing the pressure difference across the filter membrane to zero or to negative values while the current is flowing.

8. A method of cleaning a filter assembly in situ during use of the filter assembly to filter a process liquid, the filter assembly comprising a filter membrane which is electrically conducting and acts as a first fluid-permeable electrode, and a fluid-permeable second electrode, wherein the first and the second electrodes are separated from each other and spaced apart by a fluid-permeable electrically insulating sheet, the filter assembly also including electric supply means connected to the first and the second electrodes, and the method comprises causing an electric current to flow periodically and briefly between the first and the second electrodes through the process liquid as electrolyte with a current density of at least 500 A/m$^2$ so as to generate a gaseous product, at least 75 percent of the brief pulses of current having the same polarity, so that fouling material on the filter membrane is dislodged.

9. A method as claimed in claim 8 wherein the insulating sheet is a single layer of fluid-permeable material.

10. A method as claimed in claim 8 wherein the thickness of the sheet is between 0.2 mm and 3.0 mm.

11. A method as claimed in claim 8 wherein the sheet defines perforations about 2 mm across.

12. A method as claimed in claim 8 wherein the second electrode defines pores or perforations at least 0.5 mm across.

13. A method as claimed in claim 12 wherein the second electrode defines perforations between 2 mm and 4 mm across.

14. A method as claimed in claim 8 including the step of reducing the pressure difference across the filter membrane to zero or to negative values while the current is flowing.

* * * * *